(No Model.)

A. PERKINS.
TUBULAR FRAME CONSTRUCTION.

No. 500,941. Patented July 4, 1893.

Witnesses:
Harry S. Rohrer
C. H. Berry

Inventor.
Albert Perkins
By Miles & Greene,
Attorneys

UNITED STATES PATENT OFFICE.

ALBERT PERKINS, OF CHICOPEE, MASSACHUSETTS, ASSIGNOR TO THE A. G. SPALDING & BROTHERS, OF NEW YORK, N. Y., AND THE LAMB KNITTING MACHINE MANUFACTURING COMPANY, OF CHICOPEE FALLS, MASSACHUSETTS.

TUBULAR FRAME CONSTRUCTION.

SPECIFICATION forming part of Letters Patent No. 500,941, dated July 4, 1893.

Application filed September 5, 1892. Serial No. 445,036. (No model.)

*To all whom it may concern:*

Be it known that I, ALBERT PERKINS, a citizen of the United States, residing at Chicopee, in the county of Hampden and State of Massachusetts, have invented certain new and useful Improvements in Tubular-Frame Construction; and I do hereby declare the following to be a full, clear, and exact description of the invention, such as will enable others skilled in the art to which it appertains to make and use the same.

This invention relates to high grade tubular constructions, such for example as the frames of cycles, where the inexpedients of heavier work are inadmissible. In such work it is common to braze the tubes to cast or forged "unions" of various forms, or to split the end of one tube, either with or without first upsetting it, and braze the parts upon the surface of the other, or in some cases to weld the parts. Each of these plans is unsatisfactory in strength, weight, cost, durability, or in the uncertainty in each case whether the best attainable results of the particular process have been secured. Some of them have the additional disadvantage that the vibrations of tubes are arrested at the joints, causing crystallization and ultimate breakage. To avoid these evils is the object of this invention.

Figure 1:
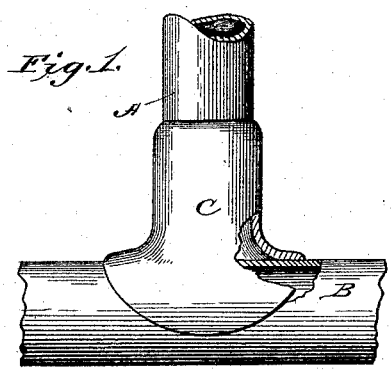
Figure 2:
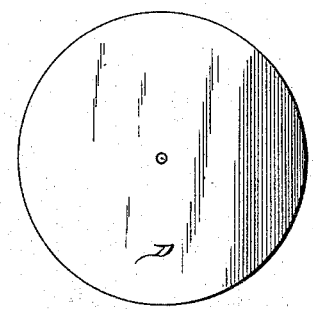
Figure 3:
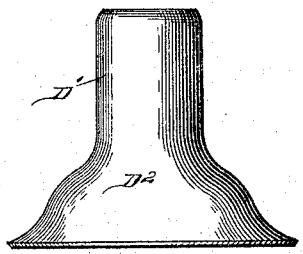
Figure 5:
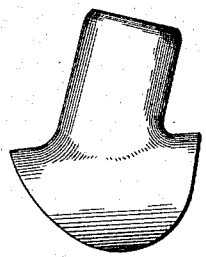
Figure 4:
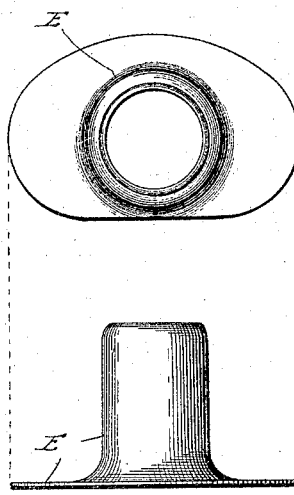
Figure 6:
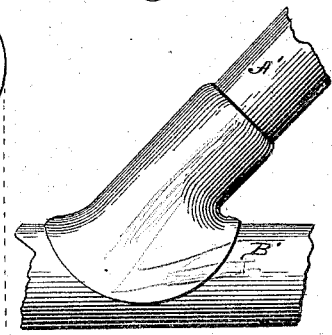

In the drawings, Figure 1 is a side elevation of two tubes joined in accordance with my invention, certain parts being broken away to show in section the internal arrangement. Figs. 2, 3, 4, show a certain joining thimble in different stages of formation. Figs. 5, 6 show two slightly different forms of the complete thimble.

In the drawings, A and B are two steel tubes and C is a steel tube passed over the end of one, flanged out upon the surface of the other, and brazed to both. The flange may be of any width desired and may vary in width at different points according to its situation and the character of the strain it is to receive. The thimble is preferably of about the same thickness as the tubes themselves and is of metal at least equally tough, owing to the manner of its formation. To form it a disk D of fine steel is struck up at the center by passing it under a series of dies while cold, and thus by a series of small changes formed into a tubular extension D' upon a convex base D''. By passing it under other dies of suitable form, while still cold, it is made to assume the form shown at E, the flange being cut during the operation to any desired shape. The flange is then bent by the use of suitable tools and either with or without the application of heat, into such form as is illustrated in Figs. 5 and 6, or in other words is so bent that it will accurately fit the surface of a tube B (Fig. 1) when it is placed thereon with the tubular extension D' making the desired angle with the tube. If it be so placed, if the tube A be placed in the tubular extension, and if the meeting surfaces be then brazed, the two tubes are united at the desired angle by a union that fulfills all the conditions suggested at the outset,—that is strong, light, inexpensive, neat in appearance, and that transmits vibrations perfectly. The dies leave the surface in excellent condition for brazing.

The whole structure is nearly homogeneous, the tubes being, in effect, thickened over a limited area and connected by a short tube of approximately the same thickness and character as the tubes themselves, since like them it is drawn with little heat or none.

What I claim is—

1. The combination with two drawn steel tubes making an angle with each other, of a short steel tube of analogous character fitting over the end of one as a sleeve, flanged out upon all sides upon the exterior surface of the other, and rigidly secured to both throughout the extent of the contact surfaces.

2. The combination with two drawn steel tubes making an angle with each other, of a steel thimble of the same character as the tubes passed over the end of one, flanged out upon the surface of the other, and brazed to both.

In testimony whereof I affix my signature in presence of two witnesses.

ALBERT PERKINS.

Witnesses:
HENRY N. LYON,
SIDNEY SANDERS.